United States Patent

Hofmann

Patent Number: 4,498,115
Date of Patent: Feb. 5, 1985

[54] MAGNETIC-TAPE CASSETTE HAVING A CAPSTAN CLEANING DEVICE

[75] Inventor: Heinrich Hofmann, Biebertal, Fed. Rep. of Germany

[73] Assignee: U.S. Philips Corporation, New York, N.Y.

[21] Appl. No.: 399,032

[22] Filed: Jul. 16, 1982

[30] Foreign Application Priority Data

Aug. 3, 1981 [DE] Fed. Rep. of Germany ....... 3130696

[51] Int. Cl.³ ............................................. G11B 23/02
[52] U.S. Cl. .................................... 360/132; 360/137; 360/128
[58] Field of Search ............... 360/132, 134, 137, 128; 15/100, DIG. 13, DIG. 12

[56] References Cited

U.S. PATENT DOCUMENTS 3,439,922 4/1969 Howard .............................. 360/137
3,955,214 5/1976 Post et al. ......................... 360/128
4,141,053 2/1979 Kara .................................... 360/128

FOREIGN PATENT DOCUMENTS 2207150 2/1972 Fed. Rep. of Germany .
2000623 1/1979 United Kingdom ................ 360/137

Primary Examiner—John H. Wolff
Assistant Examiner—David J. Severin
Attorney, Agent, or Firm—David R. Treacy

[57] ABSTRACT

A magnetic-tape cassette provided with a device for cleaning the capstan of a magnetic-tape cassette apparatus comprises at least one wiper which is connected to the housing of the cassette and which comprises a wiping edge near its free end. During tape recording or playback the wiper extends to a location near the contact area of the magnetic tape and the capstan, the wiping edge being positioned against the capstan.

8 Claims, 2 Drawing Figures

MAGNETIC-TAPE CASSETTE HAVING A CAPSTAN CLEANING DEVICE

BACKGROUND OF THE INVENTION

The invention relates to a magnetic-tape cassette provided with a device for cleaning the capstan of a magnetic-tape cassette apparatus.

A cassette for cleaning the capstan and the magnetic head of a magnetic-tape cassette apparatus is known from U.S. Pat. No. 3,955,214. This known cassette cleans the capstan by means of a felt pad which is pressed against the capstan during operation. However, this cassette does not permit the simultaneous transport of a magnetic tape along the magnetic head by the capstan for playback or recording purposes.

In audio cassettes of the compact cassette type, in which the tapes are comparatively thin, it frequently happens that tape spillage occurs during operation, if during tape transport the magnetic tape is wrapped around the capstan and/or is not wound completely onto the tape reel. Especially in cassette equipment intended for use in motor cars, in which the operating conditions are generally unfavorable, such as a high temperature and a high relative humidity, the capstan is likely to be soiled; this frequently gives rise to failure of the equipment. Under these conditions contaminants, for example abraded tape particles, are apt to settle on the capstan, causing the tape to stick to the capstan for a shorter or longer time. The tape then becomes wrapped around the capstan. As a result of this the tape transport to the tape reel is incomplete or stops, and this gives rise to the aforementioned tape spillage. Such tape-transport faults generally render the tape and consequently the magnetic-tape cassette unserviceable.

SUMMARY OF THE INVENTION

It is the object of the invention to equip a magnetic tape cassette with a simple device for cleaning the capstan, which device is operative during playback or recording.

According to the invention, the device comprises one wiper which is connected to the housing of the magnetic tape cassette, which comprises a wiping edge near its free end, and which extends from the housing in a direction opposite to the direction of transport of the magnetic tape, to a location behind the magnetic tape near the contact area of the magnetic tape and the capstan, the wiping edge being positioned against the capstan during operation.

It has been found that during operation such a wiper continuously removes and collects contaminants from the capstan in an effective manner. Furthermore, it has been found that in practice the removal of these contaminants substantially precludes tape transport problems which may give rise to tape spillage.

As a result of the location of the wiping edge such wipers do not impair the tape transport during operation. Thus, the cassette in accordance with the invention enables the capstan to be cleaned during playback or recording. This means that for cleaning the capstan it is no longer necessary to employ a special cleaning cassette, which special cassette use is generally experienced as annoying and time-consuming.

A wiper in the device in accordance with the invention may be of very simple construction. In one embodiment of the invention the wiping edge is located on a felt pad which constitutes the wiper and which is glued to the housing of the magnetic-tape cassette. By the use of the felt pad the dirt removed from the capstan can be absorbed effectively in the felt disposed between the wiping edge and the point of fixation to the housing.

In a further embodiment of the invention the wiping edge is formed by the free end of a plastic projection of the housing, which projection constitutes the wiper. Thus, the wiper may be formed simultaneously when the housing is injection-molded. Thus, the wiper need not be mounted by a separate operation.

Two embodiments of the invention will now be described in more detail, by way of example, with reference to the drawing.

DESCRIPTION OF THE PREFERRED EMBODIMENTS

Figure 1:
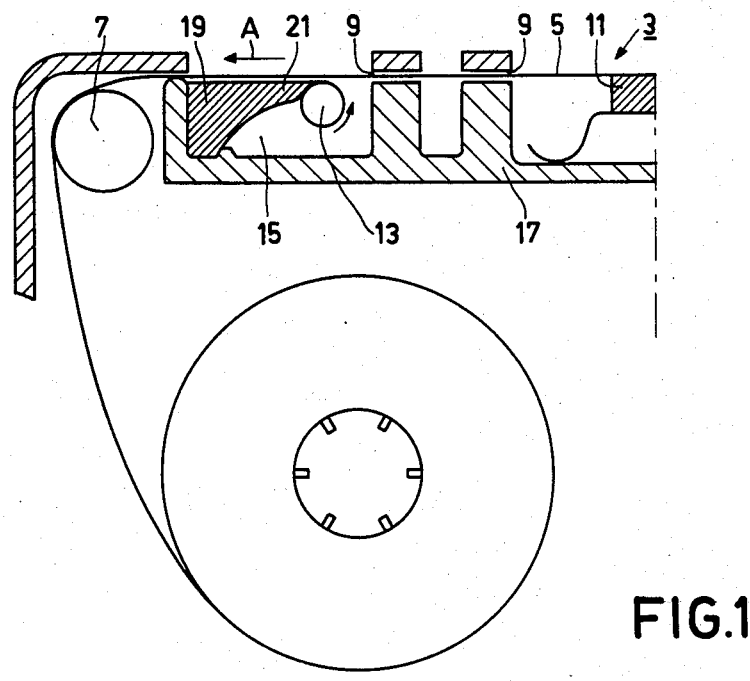
FIG. 1 is a sectional view of half the front side of a magnetic-tape cassette in accordance with the invention.

A magnetic-tape cassette 3, as shown in FIG. 1, contains a magnetic tape 5, a span of magnetic tape being moved through the gaps 9 at the front side of the cassette 3 by means of guide rollers 7. A pressure felt 11 presses against the magnetic tape 5 from the inside of the cassette. The tape-transport speed is determined by a capstan 13 of a magnetic-tape cassette apparatus, not shown, the capstan being inserted into the cassette behind the magnetic tape. The speed of rotation of the capstan is maintained accurately constant by the tape-transport mechanism of the magnetic-tape cassette apparatus.

Suitably, the other half of the cassette 3, not shown, is identical but symmetrical (mirror image) about the cassette center line. However, in this other half no capstan 13 is present during operation as shown, because a simple cassette apparatus normally comprises one capstan 13 only.

The cassette housing 17 is of a standard type in which, in accordance with the invention, a recess 15 for receiving the capstan 13 contains a felt pad 19 having a fixed end which is glued to the walls of the recess 15. The felt pad 19 may also be clamped against the walls of the housing 17.

From the location where it is fixed to the housing 17 the felt pad 19 extends in a direction opposite to the transport direction A of the magnetic tape to a point near the contact area of the magnetic tape 5 and the capstan 13. The felt pad, as shown in FIG. 1, narrows substantially from its fixed end to the free end wiper edge, which contacts the capstan opposite to the direction of rotation like a doctor blade. That is, the free end of the pad comprises a wiping edge 21, which is urged against the capstan 13 with moderate pressure during operation.

Thus the felt pad 19 which is inherently resilient can act as a wiper in a device for cleaning the capstan. In the embodiment shown in FIG. 1 the wiping edge 21 is integral with the rest of the wiper 19. Alternatively, the wiping edge may be manufactured, in a manner not shown, from another (plastic) material suitable for cleaning the capstan, which material is attached to the felt of the wiper. Because of the mirror-symmetrical construction of the cassette, the cleaning device comprises two wipers 19, which extend in opposite directions. During operation the wiping edge 21 wipes contaminants off the capstan 13, the contaminants being collected in the other part of the wiper. The porosity of the wiper material (felt) and the comparatively large absorbing area of the wiper ensure that a substantial amount of contaminants can be absorbed. The location of the wiper 19 in the recess 15 is such that when the wiper is not operative upon reversal of the cassette, in which situation an erase head can be inserted in the direction of the recess 15, the wiper does not impair the operation of the erase head. The height of the wiper 19 is such that the tape guide lugs which are generally arranged on the erase head can extend underneath and above the scraper edge of the wiper 19 respectively. Thus, the felt pad 19 does not impede these lugs when the erase head is moved towards the cassette.

A substantial advantage of this device for cleaning the capstan 13 is that during operation the edge 21 of the wiper 19 is constantly urged against the capstan 13 with moderate pressure and cleans this capstan, while as a result of the special design and location of the wiper it does not impede the pressure roller of the apparatus which co-operates with the capstan 13, so that the tape transport is not disturbed. Thus, normal tape transport is possible while cleaning the capstan 13, so that the device is suitable for recording or playback under normal operating conditions. Consequently, special activities for cleaning the capstan are no longer necessary.

Figure 2:
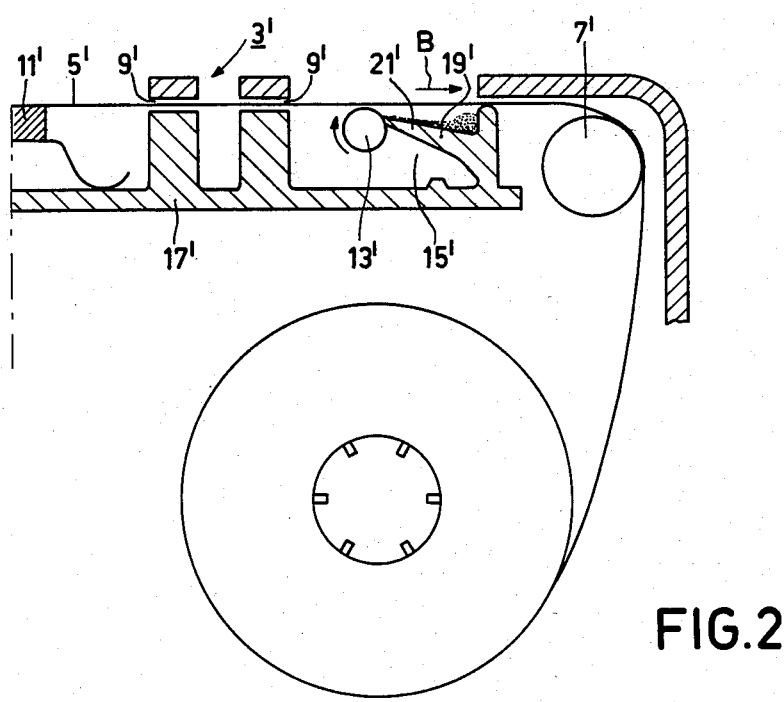
FIG. 2 is a sectional view of half the front side of a magnetic-tape cassette in accordance with the invention in a second embodiment.

FIG. 2 shows half of the front side of a second embodiment of a magnetic tape cassette in accordance with the invention, which half, as in the first embodiment, is suitably mirror-symmetrical with the other half and of which parts of a housing 17' are identical to the housing 17 in the first embodiment. The wiper 19' in this embodiment is injection-molded together with the housing 17' and is consequently made of a plastic material. From a wall of the housing 17' the wiper 19' formed by a projection extends in a direction which is substantially opposite to the transport direction B of the tape 5', against the capstan 13'. For this purpose at its narrow end the wiper 19' comprises a wiping edge 21' which is positioned against the capstan 13' against the direction of rotation, like a doctor blade or scraper. During operation the wiping edge 21' removes contaminants from the surface of capstan 13', which contaminants are subsequently moved along the wiper 19' in the direction indicated by the arrow B and are largely collected in a corner between the housing and the wiper 19'. In the same way as in the first embodiment two oppositely directed wipers are provided as a device for cleaning the capstan in a cassette 3'. In this embodiment the wiper 19 is again constructed and arranged in the housing in such a way that during normal operation of the cassette apparatus the wiper can perform the cleaning operation and does not impede the movement of the erase head upon reversal of the cassette.

What is claimed is:

1. A magnetic-tape cassette having a device for cleaning the capstan of a magnetic-tape cassette apparatus, comprising:
    a housing,
    two reel hubs mounted within said housing for rotation, and
    a length of magnetic recording tape wound on and extending between said reel hubs,
    characterized in that the device comprises at least one wiper having a fixed end fixed with respect to the housing, and a free end having a wiping edge, the wiper extending from said fixed to said free ends in a direction opposite the direction of transport of the tape, to a location behind the tape near an area of contact of the magnetic tape with a capstan of a magnetic-tape apparatus into which the cassette has been inserted, said free end having a wiping edge arranged to bear against the capstan which is inserted behind the tape,
    said wiper including means for resiliently urging said free end against said capstan with moderate pressure,
    whereby capstan cleaning is accomplished during tape recording or playback.

2. A cassette as claimed in claim 1, characterized in that said wiper comprises a felt pad glued directly to the housing of the cassette.

3. A cassette as claimed in claim 2, characterized in that said wiping edge is formed by a plastic material attached to the felt, and bears against the capstan surface against the direction of capstan rotation.

4. A cassette as claimed in claim 1, characterized in that said wiper is formed of a plastic material molded integrally with the housing.

5. A cassette as claimed in claim 4, wherein in said wiping edge bears against the capstan surface against the direction of capstan rotation.

6. A cassette as claimed in claim 5, characterized in that said wiper narrows from the fixed end to the free end, and defines a space between the wiper and an adjacent housing wall for collecting contaminants scraped from the capstan.

7. A cassette as claimed in claim 4, characterized in that said wiper narrows from the fixed end to the free end, and defines a space between the wiper and an adjacent housing wall for collecting contaminants scraped from the capstan.

8. A cassette as claimed in any one of claims 1-7, characterized in that the device comprises two wipers extending in opposite directions.

* * * * *